(12) United States Patent
Rosen

(10) Patent No.: US 6,513,025 B1
(45) Date of Patent: Jan. 28, 2003

(54) MULTISTAGE MACHINE LEARNING PROCESS

(75) Inventor: Joseph S. Rosen, Chicago, IL (US)

(73) Assignee: Teradyne, Inc., Boston, MA (US)

(*) Notice: Subject to any disclaimer, the term of this patent is extended or adjusted under 35 U.S.C. 154(b) by 0 days.

(21) Appl. No.: 09/457,989

(22) Filed: Dec. 9, 1999

(51) Int. Cl.[7] ............................................. G06N 5/02
(52) U.S. Cl. ........................ 706/45; 706/12; 706/13; 706/47
(58) Field of Search ......................... 706/45, 12, 13, 706/47

(56) References Cited

U.S. PATENT DOCUMENTS

| | | | | |
|---|---|---|---|---|
| 4,697,242 A | * | 9/1987 | Holland et al. | 706/13 |
| 4,845,739 A | * | 7/1989 | Katz | 379/92.03 |
| 4,881,178 A | * | 11/1989 | Holland et al. | 706/12 |
| 5,317,725 A | | 5/1994 | Smith et al. | 395/575 |
| 5,377,196 A | | 12/1994 | Godlew et al. | 371/20.1 |
| 5,636,344 A | | 6/1997 | Lewis | 395/200.11 |
| 5,781,698 A | * | 7/1998 | Teller et al. | 706/13 |
| 5,870,730 A | * | 2/1999 | Furuya et al. | 706/47 |
| 6,272,479 B1 | * | 8/2001 | Farry et al. | 706/13 |

* cited by examiner

*Primary Examiner*—Wilbert L. Starks, Jr.
(74) *Attorney, Agent, or Firm*—Teradyne Legal Dept.

(57) ABSTRACT

The present invention includes a mechanism for applying expert knowledge and machine-learning routines to a continuous stream of information. The present method comprises learning a set of dependability models, one for each classification model, that characterize the situations in which each of the classification models is able to make correct predictions. At appropriate intervals the method produces new fault localization knowledge in the form of decision-tree based classification and dependability models. Such knowledge is used to enhance the existing classification knowledge already available. Each of these classification models has a particular sub-domain where it is the most reliable, and hence the best choice to use. For future unlabeled examples, these dependability models are consulted to select the most appropriate classification model, and the prediction of that classification model is then accepted.

21 Claims, 2 Drawing Sheets

MULTISTAGE MACHINE LEARNING PROCESS

BACKGROUND OF THE INVENTION

The use of classification models for classifying a variety of elements is known. The input data from which the classification models are built, also called the training set, comprises multiple examples or records, each having multiple attributes or features. The objective of classification is to analyze the input data and to develop an accurate description or model for each class using the features present in the data. The class descriptions are used to classify future data for which the class labels are unknown. Several classification models have been proposed over the years, e.g. neural networks, statistical models, decision trees, and genetic models.

Problems associated with constructing classification models include the training set having a significant amount of class noise making it difficult to use for constructing accurate classification models. Further, this noise is not systematic. There is no methodology that always distinguishes misclassified examples from correctly classified but exceptional ones. Expert knowledge can be applied to reject examples which are obviously misclassified, implausible, or unsuitable for some other general reason. However, other techniques will have to be applied to reject somewhat plausible but erroneously classified examples.

One problem associated with classification models has to do with the volume of the data. The volume of data recorded, even over a short time period, may begin to reach the limits of storage normally allocated to learning tasks. Further, standard learning techniques have two significant limitations with regard to processing large amount of training examples. First, they are batch algorithms which discard the results of previous learning to reprocess the ever-growing number of training examples. Therefore, a large training set growing to millions of examples might need to be retained for an indefinite time (actually until storage runs out necessitating a purge of earlier data). Unfortunately, the training examples are useless outside being maintained for the purposes of learning. Second, most learning algorithms are limited to processing examples that fit into main memory. As the number of examples grows past this limit the algorithms slow to an unacceptable degree. Thus, we would like to learn this data incrementally if possible, and on a short cycle basis, then discard most or all of it. Most of the standard incremental learning methods either store most or all of the examples they process within the implementation structures of the classification models they construct or sacrifice an unacceptable degree of classification accuracy. The few learning algorithms which avoid storing training examples and maintain good accuracy, instead use a set of classification models learned incrementally from subsets of the training examples and then integrate them into a final composite classification model. However, by blending multiple classification models, these approaches make it difficult to explain the reasoning why a particular classification prediction was made.

Another problem associated with classification models involves limited analysis expertise. Economic considerations and the availability of domain or analysis expertise in any operating company dictate that only a limited number of individuals will be available to collect and analyze training examples and to manage the process of converting them into executable knowledge. However, such knowledge is still required to be produced in a timely fashion.

Still another problem associated with classification models involves varying test conditions. Learning must occur over the long term and so handle a large volume of data, but at the same time it must not average or smooth away short term or cyclic variations in the training set. The conditions under which features of a new unlabeled example were acquired must be considered in the classification process. Only those aspects of the classification model which can reliably make predictions about examples acquired under those conditions should be consulted.

Additionally, the output of the process utilizing the classification models must be accompanied by an explanation of why a particular classification model was chosen. This explanation may be evaluated by an analysis expert during the classification model construction process. Not all learning algorithms construct models which provide comprehensible explanations of their predictions. There must be some explanation about how inferred conditions were used in making a prediction.

Multiple pre-existing classification models may already exist within the context of the blackboard architecture of the system. These may include expert system models, case-based models; previous machine-learned (decision-tree) models, and so on. Along with these classification models is an arbitration expert system which includes algorithms for evaluating among the decisions provided by each of the classification models. The latest classification model must be integrated into the blackboard in such a way as to allow the arbitration expert system to choose between the prediction of the latest and the previous models.

Given a number of classification models and their predictions for a particular unlabeled example, one approach used is a form of voting, picking the prediction with the largest number of votes. Another approach is to learn a new model whose training set is based on predictions of the base models. It would be desirable to coalesce the predictions of the base models by learning the relationships between those predictions and the correct prediction, to identify a specific classification model as the one responsible for producing a final prediction and to include a simple explanation of why the prediction was made, and to revise the selected model as the models change over time.

SUMMARY OF THE INVENTION

With the foregoing background in mind, it is an object of the present invention to address the problems of constructing classification models in general and in a specific embodiment for subscriber loop fault localization. The present invention includes a mechanism for applying expert knowledge and machine-learning routines to a continuous stream of information. At appropriate intervals the method produces new fault localization knowledge in the form of decision-tree based classification and dependability models. Such knowledge is used to enhance the existing classification knowledge already available in the apparatus for fault segmentation. The presently disclosed method functions in the context of a system which employs a plurality of classification models. Some of these models may be expert system based, others case-based, and still others may be decision-tree based. Expert system and case-base models change over time through addition of new rules or cases respectively. With each cycle through the process another model is added to those already available. Each of these classification models has a particular sub-domain where it is the most reliable, and hence the best choice to use.

The present method comprises learning a set of dependability models, one for each classification model, that characterize the situations in which each of the classification models is able to make correct predictions. For future unlabeled examples, these dependability models are consulted to select the most appropriate classification model, and the prediction of that model is then accepted.

BRIEF DESCRIPTION OF THE DRAWINGS

The invention will be better understood by reference to the following more detailed description and accompanying drawings in which.

DESCRIPTION OF THE PREFERRED EMBODIMENT

Figure 1:
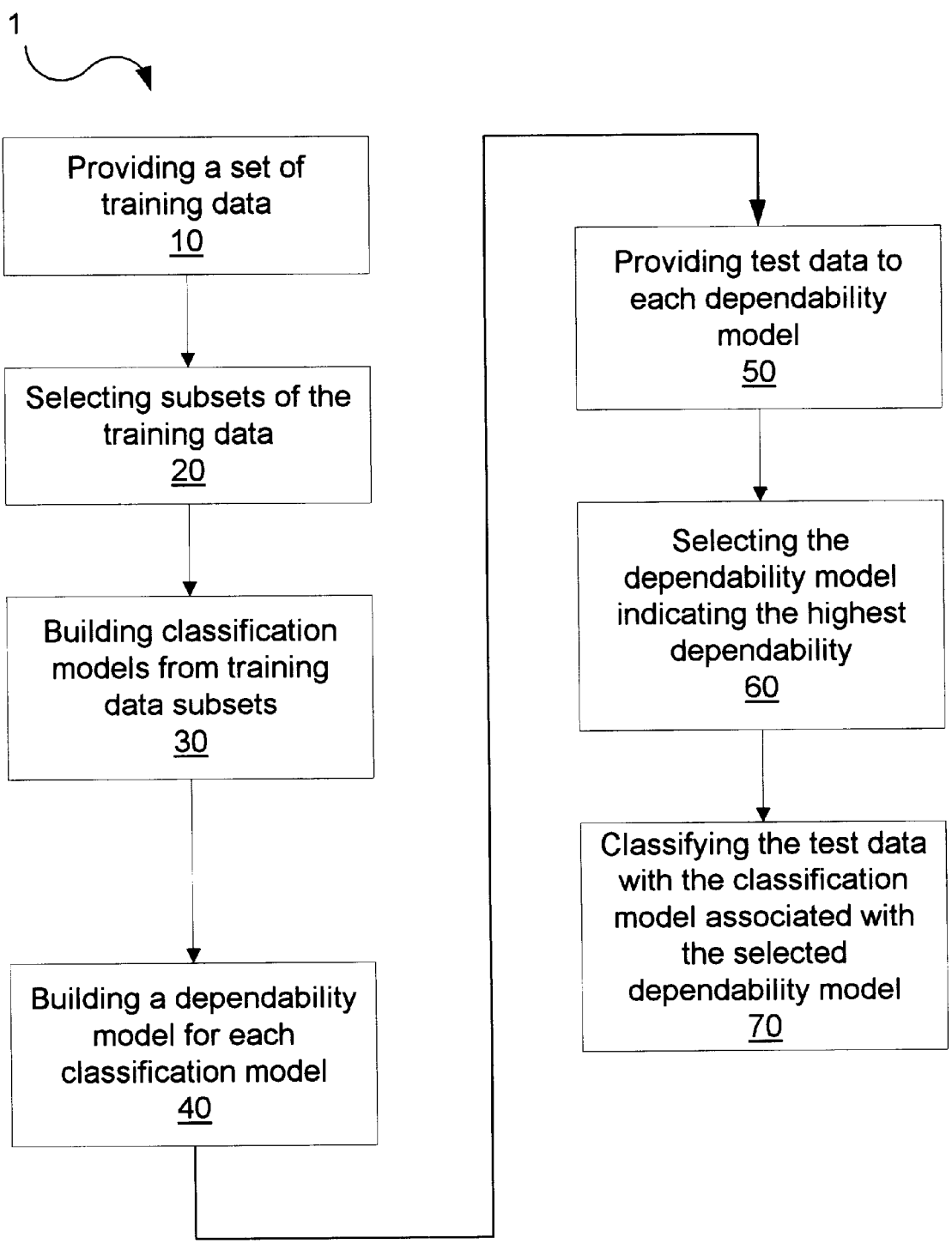
FIG. 1 is a flow chart of the presently disclosed method.

This invention relates generally to a multistage machine learning process. Machine learning involves the development of tools that can extract knowledge from data sets once the representation for the data has been defined. The discovered knowledge can be rules describing properties of the data, frequently occurring patterns, clustering of objects in the data set, etc. Classification is an important application of machine learning and can be described as follows. The input data, also called the training set, consists of multiple examples or records, each having multiple attributes or features. Additionally, each example is tagged with a special class label. The objective of classification is to analyze the input data and to develop an accurate description or model for each class using the features present in the data. The class descriptions are used to classify future data for which the class labels are unknown.

During machine learning many steps may precede the actual model construction step; preparing the training data; cleaning that data; applying the appropriate transformations to it; eliminating misclassified data. Other steps follow such as evaluating the classification model and consolidating newly produced models with already existing models. Thus, to be effective, model construction must be integrated into a machine leaning methodology that supports the entire process of transforming data to useful classification knowledge.

The presently disclosed method provides a mechanism for applying expert knowledge and machine-learning to a continuous stream of information. At appropriate intervals the method produces new fault localization knowledge in the form of decision-tree based classification and dependability models. This knowledge is used to enhance the existing classification knowledge already available.

The method executes a sequence of learning cycles. The input to each cycle is information retained since the last time the process was executed from which the current training set will be constructed; a set of historical classification models; a (much smaller) set of historical training sets. We call this the current failure information. This process is called the off-line process. Additional inputs may include: expert system models for data mapping, derived attribute calculation, and plausibility analysis; several configuration and tuning parameters; and a decision-tree induction algorithm. The output of this process is the current training set, the current classification model (so called because it was learned from only the current information), and a set of dependability models each corresponding to the current or an historical classification model. All these models are represented as a decision-trees. These models are then used as input into the process (called the on-line process) which applies these models to a specific application. Additional outputs may include a variety of reports for review by analysis and domain experts in support of further classification and process improvements. Some information persists between cycles. This includes: representations for up to max-stored-models classification and max-stored-models dependability models; and (at most) the training sets from two immediately prior learning cycles.

Several benefits are realized using this cyclic learning method. First, the cycle time can be adjusted to match the capability of the system to the rate of accumulation of new data. A cycle can be initiated when the amount of new data from which to learn begins to approach the memory and performance limits of the system. This allows scaling to large volumes of data in an incremental fashion by presenting the learning method with only the amounts of data it can process efficiently at one time. Second, very little data is required to be preserved between learning cycles. Most data is processed through only one cycle. This avoids having to maintain data for extended periods of time. Third, each cycle produces a new classification model which captures the short term conditions influencing the test and operating data used to construct the model. Thus, another way the cycle time can be adjusted is to match the period of variability of these short-term conditions. Fourth, each cycle also produces a new set of dependability models which allows integrating multiple classification models over the long term. Fifth, each cycle applies knowledge developed in the previous cycle to improve the knowledge developed in the next. This prior knowledge is the class prediction recorded with each record used as an input into the current cycle. The class is used as one of the primary feature values in guiding data merging and plausibility analysis. These two learning stages use prior knowledge to reject or reclassify misclassified training examples which could otherwise decrease the predictive accuracy of the classification models constructed during the current learning cycle.

Referring now to FIG. 1, the present process or method 1 comprises several steps that together implement the desired functionality. A first step 10 comprises providing a set of training data. The training data could comprise, for example, telephone company subscriber loop test records. The data may be historical data and may further comprise newly acquired data. The newly acquired data may be acquired periodically, and the entire process executed periodically to take advantage of the newly acquired data.

The next step 20 of the process involves identifying examples of the training which are most likely misclassified (mislabeled) and then applying expert knowledge or machine learning techniques to correctly label or else eliminate these examples.

The following step, step 30, builds a classification model for each subset of the training data. A decision-tree induction processing method is used on the training data to construct the classification models. These classification models may be grouped with existing classification models, however obtained.

At step 40 a plurality of dependability models are constructed. At this step a decision-tree induction processing method is employed to construct a dependability model for each existing classification model. The dependability model predicts whether a classification model can be depended on to correctly classify a given unlabeled example.

At step 50, the dependability models are each applied to a new unlabeled example. At step 60 the dependability model indicating the highest dependability for the unlabeled example is selected. The most dependable classification model, that is the classification model associated with the dependability model indicating the highest dependability for the unlabeled example, is chosen to classify each unclassified example. By using each classification model just in those situations for which it is the most dependable, overall accuracy is greater than that of the best single classification model for all unlabeled examples.

The models are built using a modified version of C4.5. C4.5 is a decision tree construction algorithm widely used in machine learning as a benchmark for research results. C4.5 constructs decision trees by identifying correlations between the values of features and the classes of training examples. The basic algorithm C4.5 uses for constructing decision trees is first to select the "best" feature for the root of the tree. "Best" refers to the feature that, according to some metric, best separates the different classes. The training examples are then partitioned into subsets according to the values for the selected feature with the examples in each subset sharing a different value. These subsets of examples are distributed among the nodes corresponding to each of the branches below the root node of the decision tree. The same procedure is recursively applied to these subsets of training examples, resulting in the selection of features for internal nodes of the decision tree. This process stops when all examples in a subset meet some stopping criteria, for instance, when a large majority of examples in the subset have the same class. At this point a prediction leaf is created, labeled by the class of the majority of these examples and also assigned a confidence factor.

C4.5 was modified for use in the present method, and is known as C4.5*. C4.5* differs from C4.5 in two ways. First, C4.5* constructs models whose output is an estimated class probability vector, rather than a class and confidence factor. The application of C4.5* to an example d is as follows. The inputs to C4.5* comprise: d, a vector of feature values describing an example; and M, a decision tree. The outputs comprise: $\vec{p}_l(d)$ a class probability vector using leaf l of the decision tree; $p_l$, a class prediction using leaf l of the decision tree; and $cf_l$, a confidence factor using leaf l of the decision tree. The model construction is processed by $(\vec{p}_l(d), p, cf)_l = M(d)$. There are I output classes, and $p_i(d)$ denotes the estimated probability that a classification model assigns to the ith class given the example d. Then $\vec{p}(d) = (p_1(d), \ldots, p_I(d))$ is the estimated class probability vector for example d. The formula used for the estimated class probability vector $\vec{p}(d)$, (where in all cases, $\Sigma_i p_i(d) = 1$) is shown below. Consider the leaf l of the decision tree at which the instance d falls. Then $n_i$ is the number of training examples with class i at this leaf, and the majority class at the leaf is $\hat{1}$. $E = \Sigma_{i \ne \hat{1}} n_i$ is the number of misclassified training examples at the leaf. Using the Laplace estimator:

$$P_{\hat{1}}(d) = 1 - \frac{E+1}{\sum_i n_i + 2},$$

$$p_i(d) = (1 - p_{\hat{1}}(d)) \times \frac{n_i}{E}, \text{ for } i \ne \hat{1}.$$

Using the Laplace estimator takes into account the number of training examples used to determine the class predicted by a given leaf l. The fewer the number of training examples used, the lower the $p_{\hat{1}}(d)$, will be. That is, confidence in a prediction is impacted by number of training examples used to determine it. Thus p(d) provides enhanced information about the dependability of a model's prediction. This information is put to use by the present method when constructing dependability models for classification models. Then predict($\vec{p}(d)$), is a function that returns the class with the highest probability in p(d). This class value is the prediction of M.

Another difference is the way C4.5* chooses the "best" feature to partition the training examples. While C4.5 selects the one with the highest information gain ratio, C4.5* randomly selects, with equal probability, from among all the features whose information gain ratio values are within feature-selection-percent of one another. The default value of this parameter is chosen to be zero which results in C4.5* producing trees identical to those using C4.5. However, when feature-selection-percent is chosen to be greater than zero, C4.5* constructs a decision tree using different features (with a different internal structure) when the number of examples in various subset partitions changes only slightly. Other approaches select among features whose information gain ratio values were close to one another with the probability of choosing some particular feature proportional to its information gain ratio value.

Figure 2:
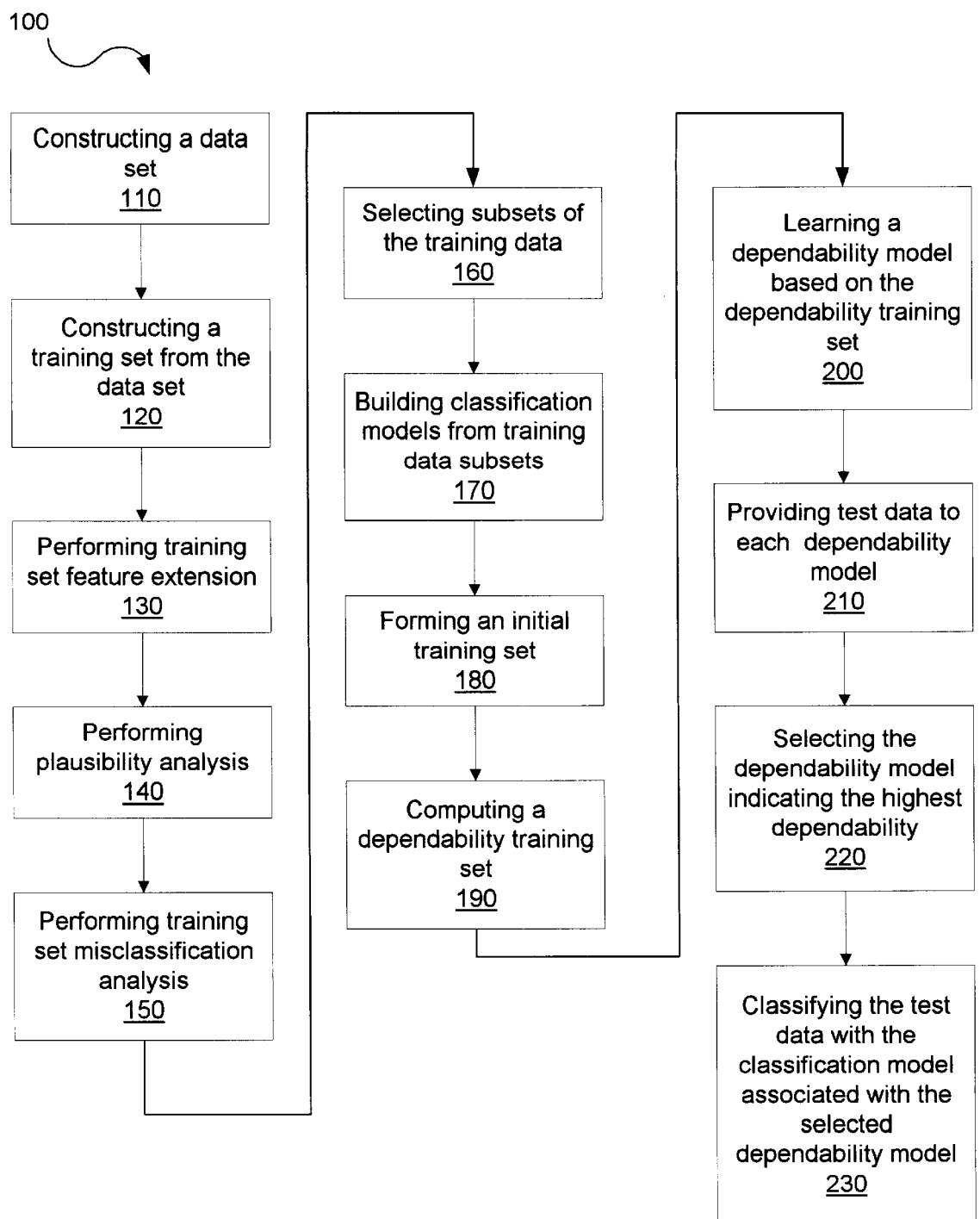
FIG. 2 is a flow chart of the presently disclosed method with respect to subscriber loop fault localization.

While the presently disclosed method has numerous applications in a variety of environments the method the will be described in detail with respect to a specific embodiment. Referring now to FIG. 2, the method is used for subscriber loop fault classification. Subscriber loop test systems are employed by operating companies to reduce network maintenance costs through providing more accurate information. However, the failure modes that must be modeled to accomplish this are highly complex. They include: corrosion effects; construction damage; weather-related damage; customer error; operating company error; and active and/or passive network element failures: cordless phones, ADSL modems/splitters, repeaters, remote concentrators, network isolation devices, load coils, and so on. Failure localization is further complicated with the need to identify operating company owned/maintained versus customer owned/maintained equipment boundaries that may vary between operating companies or depend on conditions in maintenance agreements. The presently disclosed method 100 is able construct a classification model which provides a high degree of classification accuracy from a training set which includes examples of complex failure situations and is able to indicate under which circumstances the classification models it creates are appropriate to apply and which not.

The system acquires characterization data of each subscriber loop fault localization by recording various AC and DC parameters of the loop at the time the failure is identified; a set of AC and DC parameters recorded when the loop was in a normal condition, referred to as the loop "footprint"; information about relevant network facilities supporting the loop: switch type, subscriber loop testing unit type, central office AC and DC parameters, and so on; the fault localization class predicted by the test system (using previously available classification models); operating company specific customer profile information including billing status, maintenance contract status, service packages purchased, and so on; an operating company specific customer trouble report code indicating the problem symptoms noted by the complaining party; an operating company specific close out code indicating the specific cause of the failure as reported by the repairing party; and an operating company specific work group code indicating the department or affiliation of the repairing party.

At step 110, the first part of providing a set of training data includes construction of a data set. This step is done initially to provide a historical set of data and is also done periodically to provide up-to-date information. In this particular embodiment, there are several steps involved in providing the set of training data. An initial data set is constructed merging the records from two input databases using a supplied merging algorithm. One database holds information retained for each line characterized by the fault segmentation apparatus, described above. The other database holds corresponding operating company specific information about each line which includes the close out code, work group code, and so on. The merging algorithm is customized to handle the varying record formats and information available from different operating companies and test system versions. This involves matching a test record with an operating company record to form an initial data set record which requires extensive processing. Often the time recorded for a loop test and the time an operating company entered the problem into its database differ by a significant amount. Sometimes changes to an operating company's database are postponed, or the clocks used for timestamping diverge between the loop test and operating company system. A windowing technique may be applied to facilitate matching. Duplicate records are possible if more than one test record was created for a loop between the time a problem was entered into the operating company's database and the time it was resolved. Multiple test records are the result of additional tests performed on a loop during the repair process. Only the earliest test reflects the actual fault condition of the line. Other tests may measure changes to the loop introduced by the passage of time or during repair.

The inputs for step 110 are: $D_c^{test}$, $D_c^{telco}$, and the function Merge($D_c^{test}$,$D_c^{telco}$). $D_c^{test}$ comprises a set of records from the subscriber loop test system collected since the last time this stage was executed. Each record holds feature values about a specific loop test. The features test date, test time and phone-number are the composite key used to uniquely identify each test. $D_c^{telco}$ comprises a set of records from the telephone operating company. Each record holds feature values about a specific service problem: the phone-number of the affected loop; the time the problem was entered into the system; the time the problem was resolved; the workgroup responsible for having resolved the problem; the close out code indicating what was repaired; details about any affected equipment; and other relevant data. Merge($D^{test}$, $D^{telco}$) comprises a set of merging rules that accepts sets of test and operating company records and merges them. The output of the merging rules is a single set of records $D^{merged}$. Each record holds test and operating company data about a subscriber loop. The most complex and critical jobs of the merge operation are to match a test record with an operating company record and to construct $D^{merged}$ to have no duplicate records.

The outputs of the data set construction step 110 are $D_c^{merge}$, a set of fault localization records, and a report indicating the total number of input test records, the total number of operating company records and the total number of merged records.

The data set construction is processed by operation of the function $D_c^{merge}$=Merge($D_c^{test}$,$D_c^{telco}$), which constructs a set of fault localization records and by deleting $D_c^{test}$,$D_c^{telco}$, such that test operating company data doesn't persist beyond one cycle.

The next step 120 comprises constructing the training set. The initial data set is transformed into a training set of classified fault localization examples through application of feature mapping rules. This step applies current expert knowledge to map the fault localization record features into features more appropriate for machine learning. More than just using the input loop test features, this stage examines current feature values, historical feature values, time and date values, and the previous fault localization class associated with each record to assist in selecting the appropriate mappings. This includes mapping from operating company close out to generic localization class in otherwise ambiguous cases.

The inputs for this step comprise $D_c^{merge}$ and $R^{mapping}$. $D_c^{merge}$ is a set of merged test and operating company subscriber loop test records. $R^{mapping}$ comprises a collection of rules which contain expertise about how to map: operating company specific close out codes into generic fault localization class labels; operating company specific workgroup, customer trouble report and other codes into generic codes; numeric codes into text codes (for greater clarity of representation), and so on. These rules will vary by operating company and test system version.

The outputs for this step are $D_c^{mapped}$, the initial subscriber loop fault localization training set and a report indicating the total number of examples in $D_c^{mapped}$ and the number of examples in each class.

The training set construction is processed by executing the function $D_c^{mapped}=R^{mapping}(D_c^{merge})$. This function first loads the rules into an expert system's knowledge-base. Then for each record in $D_c^{merge}$ the function asserts the records feature values into the expert system's working-memory. The rules are executed to update feature values as needed to form a training example. The training example is extracted from the expert system's working memory. The training example is added into $D_c^{mapped}$ and $D_c^{merge}$ is deleted.

The next step 130 is the training set feature extension step. The training set of classified fault localization examples is then augmented with derived features to promote more accurate classification model construction. C4.5* has no mechanism for constructing tests that express arbitrary relationships between two or more features. If only a combination of some feature values, not the individual feature values themselves, are useful for classification then C4.5* may ultimately construct a less accurate model. However, human experts are sometimes able to recognize these feature relationships. Such expertise may be expressed through feature extension rules. Enhancing the original description of each example in the training set allows C4.5* to examine complex 'features' that may otherwise be overlooked.

The inputs to this step are $D_c^{mapped}$ and $R^{extension}$. $D_c^{mapped}$ is the initial subscriber loop fault localization training set. $R^{extension}$ comprises a collection of rules which contain expertise about how to combine primitive attributes to form more descriptive composite ones. Composite features are those generated by combining primitive and other composite features together, both current and historical, using logical, algebraic, or other operators. These rules will vary by operating company and test system version. The output from this stage is $D_c^{extended}$ a subscriber loop fault localization training set with each example extended with derived feature values.

This step is processed by executing the function $D_c^{extended}=R^{extension}(D_c^{mapped})$. This function loads the rules into an expert system's knowledge-base. Then, for each record in $D_c^{mapped}$, the records feature values are asserted into the expert system's working-memory. The rules are executed to add composite feature values as needed to the training example. The updated training example is extracted from the expert system's working memory. The example is then added into $D_c^{extended}$ and $D_c^{mapped}$ is deleted.

The next step 140 is the plausibility analysis step. Plausibility analysis is performed to remove or reclassify examples in the extended training set that human expertise would consider having implausible class labels. A plausible training example is one that is internally consistent. This means that an example's feature values don't contradict each other or the class label. However, a plausible training example may still be misclassified, but this can't be decided without comparing the example to other similar examples or using other correlation techniques. The function of this step is threefold: to accept already plausible examples, to identify implausible examples, and to either reject them or correct their class labels to more plausible ones. A following learning step will evaluate plausible examples and attempt to distinguish those that are misclassified.

The inputs to step 140 are $D_c^{extended}$ and $R^{plausible}$. $D_c^{extended}$ is the subscriber loop fault localization training set with each example extended with derived feature values. $R^{plausible}$ comprises a collection of rules which evaluate the plausibility of a training example through inferences on its primitive and derived features and class label. Rather than just using loop test features, these rules examine current feature values, historical feature values, time and date values, and previous fault localization class associated with each record to assist in accepting, rejecting or reclassifying training examples. These rules will vary by operating company and test system version.

The output of this step is $D_c^{plausible}$, the subscriber loop localization training set with implausible examples removed or reclassified. Additionally a report listing attributes for each rejected record is provided. This report includes all primitive and derived attributes, the class label, and an indication of why the record was rejected. Another report listing attributes for each corrected record is also provided. This report for each corrected record includes all primitive and derived attributes, the original class label, the corrected class label, and an explanation of why the class label was corrected. The above described reports allow a domain expert to validate the behavior of the knowledge-base (rule set) and to consider any changes which may improve it.

Step 140 is processed by executing the function $D_c^{plausible} = R^{plausible}(D_c^{extended})$. A first stage in performing this function comprises loading the rules into an expert system's knowledge-base. Then, for each record in $D_c^{extended}$ the following operations are performed. The training example feature values are asserted into the expert system's working-memory. Next the rules are executed to evaluate the training example. The status of the example is indicated by the example-status element in working memory. The class label is indicated by the class-label element in working memory. If the example-status is 'accepted', then the example is added into $D_c^{plausible}$. If the example-status is 'changed' then the example's class label is changed to class-label and it is added into $D_c^{plausible}$. Also a changed class label report record for the example is written. If the example-status is 'rejected' then the example's class label is changed to class-label and it is added into $D_c^{plausible}$. Also a rejected example report record is written.

Default rules, open to extension, which identify and correct or reject records as having implausible close out codes under the following conditions are listed below. Immediately preceding the rule, which takes the form of an IF/THEN statement, is an explanation of the rule.

Service center operators have no capability for diagnosing outside plant (cable) or central office faults other than through use of a loop test system. If the system indicates no physical problems exist on a loop under test, assigning that problem to cable or central office without direct investigation using outside repair staff is not supported by available information. The following rules are applied:

| | |
|---|---|
| IF | work-group = service-center-reception |
| and | class-label = network-fault or central-office-fault |
| and | localization-prediction = tested-ok |
| THEN | reject this example |

A service affecting resistance fault detected on the loop should not be closed out as no-fault-found or tested ok.

| | |
|---|---|
| IF | class-label = tested-ok |
| and | some resistance condition on the loop measures < 20K Ohms |
| THEN | reject this record |

If the normal condition of the loop (stored footprint) indicates a cable length that is several hundred feet longer than the current measured cable length and the loop currently is not terminated by CPE or network termination device, then the close out should not be to the premises.

| | |
|---|---|
| IF | (footprint-cable-length - current-cable-length) > 500 ft. |
| and | premises-termination = not-detected |
| and | network-termination = not-detected |
| and | class-label = premises-fault |
| THEN | correct this record: set class-label equal to network-fault |

A service affecting tip- or ring-ground condition detected on the loop should not be closed out as a premises fault.

| | |
|---|---|
| IF | class-label = premises-fault |
| and | resistance-tip-ground < 20K Ohms or resistance-ring-ground < 20K Ohms |
| THEN | correct this record: set class-label equal to network-fault |

A service affecting tip- or ring-cross fault detected on the loop should not be closed out as a premises fault.

| | |
|---|---|
| IF | class-label = premises-fault |
| and | resistance-tip-cross < 20K Ohms or resistance-ring-cross < 20K Ohms |
| THEN | correct this record: set class-label equal to network-fault |

A service affecting cable imbalance exists, where one side of the cable is currently measured as several hundred feet shorter than the footprint length of the cable, should not be closed out to premises or central office.

| | |
|---|---|
| IF and and THEN | class-label = premises-fault or central-office-fault (footprint-cable-length - current-cable-length) > 1000 ft. capacitive-imbalance > 15% reject this record |

A service affecting background noise or power influence fault detected on the loop should not be closed out as tested ok.

| | |
|---|---|
| IF and THEN | class-label = tested-ok power-influence = severe or background-noise = severe reject this record |

A service affecting tip-ground/ring-ground capacitive imbalance detected on the line should not be closed out as no fault found or tested ok.

| | |
|---|---|
| IF and THEN | class-label = tested-ok capacitive-imbalance > 15% reject this record |

A receiver-off-hook condition with no other service affecting conditions should only be closed out to tested-ok.

| | |
|---|---|
| IF and and THEN | line-condition = receiver-off-hook no other service affecting conditions identified class-label not equal to tested-ok correct this record: set class=label to tested-ok |

If a loop repair has been closed out to records or some other administrative cause, then a non-loop problem exists and the record should be rejected.

| | |
|---|---|
| IF THEN | class-label = records-error or unknown-error reject this record |

If a loop tests ok and its footprint AC and DC parametric data differs by no more than 2% from measurements acquired when a failure was reported, but the close out is not tested-ok then the record should be rejected. A line with no measurable deviations from its normal condition has no information from which to learn a fault classification.

$$\left(\frac{|currentParameter - footprintParameter|}{currentParameter} \times 100\right) > 2$$

If a loop tests ok but its previous localization prediction indicated a fault-cable and the operating company repair record was closed over 24 hours from when the test was performed, then change the class-label to fault-cable. This is a situation where the fault may have been repaired by another party or the conditions causing the cable problem may have self-corrected.

| | |
|---|---|
| IF and and | class-label = tested-ok localization-prediction = fault-cable close-time - test-time > 24 hrs. |

THEN correct this record: set class-label to fault-network

The next step 150 is the training set misclassification analysis step. A decision-tree construction algorithm is applied to identify and eliminate mislabeled training examples from the plausible training set to create a final training set. One goal of machine learning is to form a model from a set of training examples such that classification accuracy on previously unclassified examples is maximized. The maximum accuracy depends on the quality of the data and the chosen learning algorithm. Step 150 focuses on improving the quality of the training set by identifying and eliminating plausible but mislabeled examples prior to applying the chosen learning algorithm thereby increasing classification accuracy. The approach used is an iterative re-filtering method that alternatively constructs multiple models using the training set, and then removes from the training set all the examples the models misclassify. This cycle of constructing models and removing examples from the training set continues until some stopping criteria are met. We stop iterating when none of the examples in the filtered training set are misclassified by all classifiers, or when the size of original training set has been reduced by filter-limit-percent. This method results in a filtered training set with up to filter-limit-percent suspicious examples removed. Using this parameter prevents this stage from rejecting more examples than prior knowledge of the actual misclassification rate would suggest is appropriate.

Filter-model-count classification models are constructed from different samples of the training set and then these models are used to identify mislabeled training examples by voting. A feature-selection-percent greater than zero (20–25% recommended) is used to influence C4.5* to construct alternative models based on small differences in the training sets. A minimum of example-misclassification-count classification models must misclassify an example for it to be evaluated as mislabeled. It is desirable to minimize the probability of discarding an example that is an exception rather than an error even though it is hard to distinguish between errors and exceptions. The probability of discarding an example that is an error is maximized. The value for example-misclassification-count determines how aggressively or conservatively suspicious examples are rejected from the training set as indicated below:

If example-misclassification-count is equal to filter-model-count then an example will be identified as mislabeled only if all classification models misclassify it. This is the most conservative position possible and eliminates the fewest examples from the training set.

If example-misclassification-count is equal to $$\lfloor (filter - model - count/2) + 1 \rfloor$$

then an example will be identified as mislabeled only if a majority of classification models misclassify it. This is an intermediate position and balances retaining exceptions and eliminating errors from the training set.

If example-misclassification-count is set to one, then an example will be identified as mislabeled if any classification model misclassify it. This is the most aggressive position possible and eliminates the most examples from the training set.

The reports produced at the conclusion of this step allow the input parameters detailed above to be changed to achieve an acceptable rejection rate for training examples based on criteria established by operating company policies and the advise of domain experts.

The inputs to step 150 comprise filter-limit-percent, filter-model-count, example-misclassification-count, feature-selection-percent, $D_c^{plausible}$, and C4.5.*. The filter-limit-percent is the maximum percent of training examples this stage will be allowed to remove from $D_c^{plausible}$. The filter-model-count comprises the number of classifier models to construct to use as misclassification filters. The example-misclassification-count comprises the number of models which must misclassify an example before it is rejected from the training set. This defaults to filter-model-count. The feature-selection-percent influences C4.5* to select, with equal probability, from among all the features whose information gain ratio values are within this percent of one another during model construction. $D_c^{plausible}$ includes the subscriber loop localization training set with implausible examples removed or reclassified. As discussed above, C4.5* is the decision-tree induction algorithm.

The outputs of this step comprise $D_c^{filtered}$ which is the subscriber loop localization training set with misclassified examples removed. A report for each rejected record listing all primitive and derived attributes, the class label, and an indication of why the record was rejected is provided as is a report indicating the number of examples in $D_c^{plausible}$, the number of examples in $D_c^{filtered}$ and the percent of examples removed from $D_c^{plausible}$.

This stage is processed by performing the following functions:

Define function size(x) to return the number examples of training set x

Define function class(d) to return the class label of a training example d $D_c^{filtered} = D_c^{plausible}$ min-filtered-training-set-size=size($D_c^{filtered}$)−(size ($D_c^{filtered}$)×filter−limit−percent)

Repeat the following:

a) error=false b) For each trial t=1,2, . . . , filter-model-count, a new training set, $D_t$ is sampled with replacement from $D_c^{filtered}$. This sampled training set is the same size as the filtered training set, but some examples may not appear in it while others may appear more than once. The learning algorithm C4.5* generates a classification model $M_t$ from each training set $D_t$.

c) For size($D_c^{filtered}$) iterations 1. select a training example s without replacement from $D_c^{filtered}$ 2. $(\vec{p}_t(s), p, cf)_t = M_t(s)$ 3. if predict($\vec{p}_t(s)$)≠class(s) for example-misclassification-count models then $D_c^{filtered} = D_c^{filtered} - s$ and error=true 4. if size($D_c^{filtered}$)≦min−filtered−training−set−size then break out of c) Until error=false or size ($D_c^{filtered}$)≦min−filtered−training−set−size The next step 160 comprises the selection of training data subsets. These subsets may include the current filtered training set; the current plausible training set; and a composite test set composed using (if available) the prior two historical plausible training sets.

The next step 170 is the classification model construction step. If the total number of saved classification models constructed using the present method has reached max-stored-models, the oldest model is discarded. Then the C4.5* algorithm is executed to construct a classification model from the current filtered subset of training examples. The accuracy of this model is evaluated using 10-fold cross-validation with different test sets: These cross-validations studies are intended to highlight maximum accuracy using the current filtered training set; accuracy on examples which have proven difficult to learn using the current plausible training set; and accuracy on examples acquired under past conditions: using historical plausible training sets.

The inputs to step 170 include $D_c^{plausible}$, $D_c^{filtered}$, $D_{c-1}^{plausible}$, $D_{c-2}^{plausible}$, $R^{simplify}$, max-stored-models, and C4.5*. $D_c^{plausible}$ is the subscriber loop localization training set with implausible examples removed. $D_c^{filtered}$ comprises the subscriber loop localization training set with misclassified examples removed. $D_{c-1}^{plausible}, D_{c-2}^{plausible}$ comprise the plausible examples sets from the previous two cycles (if available). $R^{simplify}$ is a collection of rules which eliminate certain features from all training set examples. These are features whose values are not useful for constructing a classification model or whose values are not available when the classification model is applied. Features not useful for classification include the phone number, receptionist id, and so on. Features not available when the classification model is applied include the previous model's localization prediction, the close out code, and so on. Max-stored-models, defines the lifetime of a model as the number of leaning cycles over which it is retained. The lifetime of any model is limited to a maximum of max-stored-models learning cycles, a positive integer. Over multiple learning cycles some number of classification models will be constructed. The choice of value for this parameter should be made based on the length of the longest major cycle in the domain from which the training examples are collected. For subscriber loop testing this is best chosen to correspond to somewhat longer than a defined season. The purpose of this is to limit the lifetime of a model to minimize the influence of out-of-date situations on future predictions.

The outputs of this step comprise $CM_c$, the current classification model represented as a decision tree and a report providing the decision tree in human readable format. Also provided by this step is a report indicating the average accuracy of $CM_c$ when applied to each of the above mentioned training sets and a report indicating whether a historical classification model was discarded and the creation date of that model.

Step 170 is processed by first removing the oldest classification and dependability models if the current number of stored models equals max-stored-models. Then the functions $D_c^{simplified} = R^{simplify}(D_c^{filtered})$ and $CM_c = C4.5*(D_c^{simplified})$ are executed.

The next three steps 180, 190, and 200 are used to provide a dependability model for each classification model. Constructing a dependability model is a three step process: forming an initial training set, then, for each classification model, computing a dependability training set and finally learning a dependability model based on this training set.

The first stage is to form an initial training set, as recited in step 200. This is done only once before dependability models are learned for any of the input classification models. The training set $D_0$ is composed of three parts. The first part comprises 100% of the current training set $D_c^{plausible}$; the second part comprises first-prior-examples-percent of the historical training set $D_{c-1}^{plausible}$ (if available) which are selected randomly without replacement; and the third part comprising second-prior-examples-percent of the historical training set $D_{c-2}^{plausible}$ (if available), selected randomly without replacement. The first-prior-examples-percent and second-prior-examples-percent are parameters supplied to the process. By default, first-prior-examples-percent is 50% and second-prior-examples-percent is 25%. $D_0$ is constructed to contain mostly examples that describe current situations, but with enough immediately prior historical examples included to smooth very short term variability. $D_0$ is being used as a training set despite the fact that examples of $D_0$ were used to train some of the classification models. Further, $D_0$ is constructed using examples from plausible, rather than filtered training sets. This is critical to the dependability modeling approach. By constructing $CM_i$ from filtered training examples the domain of dependability has been reduced to only those situations represented through examples which have survived the filtering process. Since any such process introduces a certain bias into the training set and hence into $CM_i$, this bias must be accounted for in the corresponding dependability model. $D_0$ is the result of applying $R_{simplify}$ to all the above selected examples as shown below.

$$D_0 = R^{simplify}\begin{pmatrix}(D_c^{plausible} + \\ (first-prior-examples-percent \times D_{c-1}^{plausible}) + \\ (second-prior-examples-percent \times D_{c-1}^{plausible}))\end{pmatrix}$$

The next stage in the building of the dependability model is step 190. Step 190 comprises computing a dependability training set. This is done again for each input classification model. This step differs depending on the type of classification model.

When the classification model is an input decision-tree classification model $CM_j$ two things need to be done. The first is to apply the model to each example d in $D_0$ to produce $\vec{p}_{j,l}(d)$ the class probability vector for leaf l. The second thing which needs to be done is to augment the features of example d with $\vec{p}_{j,l}(d)$ and the id l of the tree leaf reached for this prediction. At this point the example appears as: $(\vec{x}_d, \vec{p}j, l(d), c)$, where $\vec{x}_d$ is a vector of feature values for example d; and c is the class label. These augmented features are unique and highly descriptive of the prediction. Including l identifies the path taken through the decision tree for this prediction. Including $\vec{p}_{j,l}(d)$ rather then just the predicted class provides an indication as to the strength of the prediction verses its alternatives.

When the classification model is an input rule-based classification model $CM_j$ two things need to be done. The first is to apply the model to each example d in $D_0$ to produce p the class prediction and cf the certainty factor for the dth example, for the jth classification model. The next thing that needs to be done is to augment the features of the dth example with p, cf and the id r of the rule used for this prediction. At this point the example appears as: $(\vec{x}_d, p, cf, r, c)$ When the classification model is an input case-based classification model $CM_j$ two things need to be done. First, the model is applied to each example d in $D_0$ to produce p the class prediction; mat the highest match score, acc the accuracy score, and mct the match count for the dth example, for the jth classification model. The match score is the weighted average of the differences between each of the feature values of d and the values of the same features for a record in the case-base. The class label of the case-base record with the highest match score is used as the prediction p. The accuracy score is the percent of case-base records with match scores within 10% of the highest match score which have the same class label as the record with the highest match score. The match count is the number of case-base records with match scores within 10% of the highest match score. Next, the features of the dth example are augmented with p, acc, mat and mct. At this point the example appears as: $(\vec{x}_d, p, acc, mat, mct, c)$.

These examples are used to form a new set of training instances $D_i$, which is used as input to a learning algorithm that computes a dependability model. $AM_i$ is computed as defined below.

For a decision-tree based model the class label for each training set example is determined according to the following rule. If $predict(\vec{p}(d))=c$ then label the training example as 'Correct' otherwise label it as 'Incorrect':

$$D_i = \begin{cases}(\vec{x}_d, \vec{p}_{j,l}, l, Correct), predict(\vec{p}_{j,l}) = c \\ (\vec{x}_d, \vec{p}_{j,l}(d), l, Incorrect), predict(\vec{p}_{j,l}) \neq c\end{cases}$$

For a rule-based model the class label for each training set example is determined according to the following rule: If the prediction is for class c then label the training example as 'Correct' otherwise label it as 'Incorrect'.

$$D_i = \begin{cases}(\vec{x}_d, p, r, Correct), p = c \\ (\vec{x}_d, p, r, Incorrect), p \neq c\end{cases}$$

For a case-based model: The class label for each training set example is determined according to the following rule: If the prediction is for class c then label the training example as 'Correct' otherwise label it as 'Incorrect'.

$$D_i = \begin{cases}(\vec{x}_d, p, acc, mat, mct, Correct), p = c \\ (\vec{x}_d, p, acc, mat, mct, Incorrect), p \neq c\end{cases}$$

The next step 200 comprises building a dependability model for each classification model. The process for constructing the dependability models is as follows: The following steps are performed in order to learn a dependability model. A dependability model is learned for each training set $D_i$. $DM_i = C4.5*(D_i)$. $D_{c-2}^{plausible}$ is deleted if it exists. If $D_{c-1}^{plausible}$ exists then $D_{c-2}^{plausible} = D_{c-1}^{plausible}$. Then $D_{c-1}^{plausible} = D_c^{plausible}$. A set of classified examples is used in order to find the strengths and weaknesses of given classification models. Then it can be determined for what subsets of examples the classification model's prediction can be taken to be dependable and to what extent. The inputs to this step include all the available classification models, the current and any retained historical training sets and some configuration parameters. The outputs are a set of dependability models, one corresponding to each input classification model and a report providing a human readable representation for each dependability model for an expert to review.

A dependability model predicts whether the class of an unclassified loop test example will be predicted correctly by its corresponding classification model. This requires that a dependability model be constructed using a special training set of examples, which describe under what conditions a classification model will make a correct, or an incorrect prediction. This special training set is constructed by using the classification model to classify examples in a loop test training set. Each example is relabeled according to whether the classification model makes a correct prediction for it or not, and enhanced with other features to describe properties of the classification model that contribute to the prediction. These other features depend on the classification model representation.

New dependability models are constructed during each cycle. Thus, dependability models change as classification models (of whatever representation) change over time. A final minor task for this stage is to delete $D_{c-2}^{plausible}$ (if previously retained), make $D_{c-1}^{plausible}$ (if previously retained) the new $D_{c-2}^{plausible}$ and make $D_{c}^{plausible}$ the new $D_{c-1}^{plausible}$ as only the two immediately prior training sets of plausible records are retained across learning cycles.

Inputs to this step of the process are $D_{c}^{plausible}$, $D_{c-1}^{plausible}$, $D_{c-2}^{plausible}$, first-prior-examples-percent, $R^{simplify}$, second-prior-examples-percent, and $CM_k, \forall k$. $D_{c}^{plausible}$ is the current subscriber loop localization training set with implausible examples removed. $D_{c-1}^{plausible}$, $D_{c-2}^{plausible}$, are the prior two subscriber loop localization training sets with implausible examples removed (if available). The first-prior-examples-percent comprises the percent of examples to select without replacement from $D_{c-1}^{plausible}$. $R^{simplify}$ comprises a collection of rules, which eliminate certain features from all training set examples. The second-prior-examples-percent is the percent of examples to select without replacement from $D_{c-2}^{plausible}$. $CM_k, \forall k$, comprises all available classification models.

The outputs of this step of the process comprise $DM_k, \forall k$ a set of k dependability models corresponding to the k classification models and a report presenting each dependability model constructed in a human readable format.

The next step 210 comprises providing the test data to each dependability model. The inputs to this step comprise $CM_k, \forall k$, $DM_k, \forall k$, $R^{mapping}$, $R^{extension}$, min-dependability-probability, $\vec{m}$, $\vec{f}$, $\vec{t}$. $CM_k, \forall k$, comprise all available classification models using any representation acceptable to the framework. $DM_k, \forall k$ comprise a set of k dependability models corresponding to the k classification models. $R^{mapping}$ comprises a collection of rules which contain expertise about how to map operating company specific codes into generic codes; numeric codes into text codes, and so on. $R^{extension}$ comprises a collection of rules which contain expertise about how to combine primitive attributes to form more descriptive composite ones. The min-dependability-probability is the minimum probability at which to accept the dependability of a classification model. $\vec{m}$ are the parameters obtained during a subscriber loop test. $\vec{f}$ comprises the parameters recorded when the loop was in a normal condition. $\vec{t}$ comprises the parameters available from telephone operating company databases and other inputs during a subscriber loop test.

The outputs of this step provides a loop fault class (locale) prediction, a confidence factor (estimated probability) for that prediction, and an explanation for the prediction. For decision trees constructed using this method, the explanation identifies the tree and indicates the decision path from tree root to classifying leaf. Additionally a test record to retain for future machine learning is provided.

This step is processed as follows. The function prob$(\vec{p}_{i,l}^{AM}(\vec{x}),c)$ is defined to return the probability value from $\vec{p}_{i,l}^{AM}(\vec{x})$ for the class label c. The function $\vec{x} = (\vec{m}, \vec{f}, \vec{t})$, constructs the initial loop description from available parameters. The function $\vec{y} = R^{mapping}(\vec{x})$, maps the initial loop description features as needed to generic ones. The function $\vec{z} = R^{extension}(\vec{y})$, adds composite features to the mapped loop description.

When $CM_i$ is a decision tree model then the function $\vec{p}_{i,l}^{CM}(\vec{z}) = CM_i(\vec{z})$, is used to classify the loop failure using its description; and returns the estimated probability vector for the leaf used to make the prediction. The function $\vec{a} = (\vec{z}, \vec{p}_{i,l}^{CM}, 1)$, constructs the example to present to $DM_i$, the dependability model corresponding to $CM_i$ and the function $\vec{p}_{i,l}^{AM}(\vec{a}) = DM_i(\vec{a})$, predicts if $CM_i$ is dependable and to what extent.

When $CM_i$ is a expert rule model then the function $(p,cf,r)_i = CM_i(\vec{z})$, classifies the loop failure using its description; returns the predicted class, a certainty factor; and the rule used to make the prediction. The function $\vec{a} = (\vec{z},p,cf,r)$, constructs the example to present to $DM_i$, the dependability model corresponding to $CM_i$, and the function $\vec{p}_{i,l}^{AM}(\vec{a}) = DM_i(\vec{a})$, predicts if $CM_i$ is dependable and to what extent.

When $CM_i$ is a case model the function $(p,acc,mat,mct)_i = CM_i(\vec{z})$ classifies the loop failure using its description; returns the predicted class, a certainty factor; and the rule used to make the prediction. The function $\vec{a} = (\vec{z},p,acc,mat,mct)$ constructs the example to present to $DM_i$, the dependability model corresponding to $CM_i$, and the function $\vec{p}_{i,l}^{AM}(\vec{a}) = DM_i(\vec{a})$, predicts if $CM_i$ is dependable and to what extent.

The next step 220 comprises choosing the appropriate classification model. This step chooses from among the fault localization predictions of the multiple available classification models of all representations. Given a set of classification and dependability models this stage provides an arbitration algorithm to help classify each new unclassified example. The algorithm classifies each new example according to the classification model whose dependability model indicates it is most accurate in classifying training set examples similar to the unclassified example. Rather than try to combine the results of different classification models, the present method selects the right classification model to use. This is performed by executing $\vec{p}_{i,l}^{AM}(\vec{a})$ where predict$(\vec{p}_{i,l}^{AM}(\vec{a}))$=Correct. Select the $\vec{p}_{i,l}^{AM}(\vec{a})$ with maximum prob$(\vec{p}_{i,l}^{AM}(\vec{a}),$Correct$)$. Ties are broken by a random selection process. The following function is also performed:

If prob$(\vec{p}_{i,l}^{AM}(\vec{a}),$Correct$) \geq$ min-dependability-probability then
   Choose $CM_i$, the corresponding classification model
Else
   Indicate no $CM_i$ is applicable If for all $\vec{p}_{i,l}^{AM}(\vec{a})$, predict$(\vec{p}_{i,l}^{AM}(\vec{a}))$=Incorrect then
   Indicate no $CM_i$ is applicable If no $CM_i$ is applicable then
   Use some alternative arbitration algorithm
Else
   Use the indicated $CM_i$ to provide the fault locale prediction, confidence factor, and so on $(p,cf)_i = CM_i(\vec{z})$ where p is the fault locale prediction and cf is the confidence factor.

Step 230 classifies the data with the selected classification model. This use of dependability models to combine multiple classification models has several advantages. First, a clear explanation can be provided for the prediction by referencing the particular classification model used. Second, classification models can be integrated having different representations. Third, high classification accuracy is achieved through the use of multiple models, which together represent knowledge extracted from possibly millions of training records.

The present invention includes a mechanism for applying expert knowledge and machine-learning routines to a continuous stream of information. At appropriate intervals the method produces new knowledge in the form of decision-tree based classification and dependability models. Such knowledge is used to enhance the existing classification knowledge already available. Each of these classification models has a particular sub-domain where it is the most reliable, and hence the best choice to use. The present method learns a set of dependability models, one for each classification model, that characterize the situations in which each of the classification models is able to make correct predictions. For future unlabeled examples, these dependability models are consulted to select the most appropriate classification model, and the prediction of that model is then accepted. Accordingly, a higher degree of classification accuracy is achieved.

Having described preferred embodiments of the invention it will now become apparent to those of ordinary skill in the art that other embodiments incorporating these concepts may be used. Accordingly, it is submitted that the invention should not be limited to the described embodiments but rather only by the spirit and scope of the appended claims.

What is claimed is:

1. A method of operating an expert system to diagnose service affecting conditions on lines in a telecommunications network comprising:

providing a set of training data, the data set made up of records with each record containing parameters indicative of measurements made on a line and a state of the line at the time the measurements were made;

selecting a plurality of subsets of the training data, wherein at least a first one of the subsets represents training data gathered during a first interval and at least a second one of the subsets representing training data gathered during a second interval after the first interval;

building a plurality of classification models, one from each of said plurality of subsets of the training data;

building a plurality of dependability models, one for each of said plurality of classification models;

providing test data derived from a line in the telecommunication network to each of said dependability models;

selecting a dependability model indicating the highest dependability from said plurality of dependability models; and classifying the test data with the classification model associated with the dependability model indicating the highest dependability providing additional training data during a third interval after the second interval;

using the additional training data to create additional classification models and additional dependability models;

replacing the classification models and dependability models created with a first of the subset of data with the additional classification models and additional dependability models; and thereafter applying test data on a line in the telecommunication network gathered after the third interval to the dependability models to select a classification model.

2. The method of claim 1 wherein said step of building a plurality of classification models comprises building classification models of the type selected from the group consisting of a decision tree model, an expert system model and a case-based model.

3. A method of operating an expert system comprising:

providing a set of training data;

selecting a plurality of subsets of the training data;

building a plurality of classification models, one from each of said plurality of subsets of the training data;

building a plurality of dependability models, one for each of said plurality of classification models;

providing test data to each of said dependability models;

selecting a dependability model indicating the highest dependability from said plurality of dependability models; and classifying the test data with the classification model associated with the dependability model indicating the highest dependability;

wherein said step of building a plurality of dependability models comprises building decision tree based dependability models.

4. The method of claim 1 wherein said step of building a plurality of classification models comprises building a plurality of classification model having an output which is an estimated class probability vector.

5. The method of claim 1 wherein said step of providing a set of training data includes the step of periodically providing a new set of training data.

6. The method of claim 5 wherein said step of periodically providing a new set of data comprises providing loop failure information data acquired since a previous cycle.

7. The method of claim 1 wherein said step of providing a set of training data further comprises the step of applying feature mapping rules to an initial set of data.

8. The method of claim 7 wherein said step of providing a set of training data further comprises the step of augmenting the initial set of data with derived features to promote more accurate classification model construction.

9. The method of claim 1 wherein said step of providing a set of training data further comprises the step of performing a plausibility analysis which removes or reclassifies data having implausible class labels.

10. The method of claim 1 wherein providing additional training data comprises providing the new data at a predetermined cycle time.

11. The method of claim 10 wherein said step of providing a new set of data at a predetermined cycle time is adjustable.

12. The method of claim 1 wherein said step of providing a set of training data further comprises the step of eliminating misclassified training data.

13. The method of claim 1 wherein said step of selecting a plurality of subsets of the training data comprises the step of utilizing a randomization technique to select a feature to partition the training data by.

14. The method of claim 13 wherein said step of utilizing a randomization technique comprises randomly selecting from among all the features having information gain ratio values within a feature-selection-percent of each other.

15. The method of claim 1, after said step of building a plurality of classification models, including the step of keeping up to a predetermined maximum number of classification models.

16. The method of claim 1 wherein said step of providing a set of training data comprises providing a set of subscriber loop test records.

17. The method of claim 16 wherein said step of building a plurality of dependability models comprises building dependability models which predict whether the class of an unclassified loop test example will be predicted correctly by a corresponding classification model.

18. The method of claim 1 wherein said step of building a plurality of dependability models includes the step of forming an initial training set.

19. A method of operating an expert system comprising:

providing a set of training data;

selecting a plurality of subsets of the training data;

building a plurality of classification models, one from each of said plurality of subsets of the training data;

building a plurality of dependability models, one for each of said plurality of classification models;

providing test data to each of said dependability models;

selecting a dependability model indicating the highest dependability from said plurality of dependability models; and classifying the test data with the classification model associated with the dependability model indicating the highest dependability;

wherein said step of building a plurality of dependability models includes the step of computing a dependability training set from said initial training set.

20. The method of claim 19 wherein said step building a plurality of dependability models includes learning a dependability model based on said dependability training set.

21. The method of claim 1 wherein said step of providing a set of training data comprises providing a set of fault localization records.

* * * * *